(12) United States Patent
Ishizaki et al.

(10) Patent No.: US 10,793,749 B2
(45) Date of Patent: Oct. 6, 2020

(54) 2-CYANOACRYLATE-BASED ADHESIVE COMPOSITION

(71) Applicant: TOAGOSEI CO., LTD., Tokyo (JP)

(72) Inventors: Kenichi Ishizaki, Nagoya (JP); Yushi Ando, Takaoka (JP)

(73) Assignee: TOAGOSEI CO., LTD., Tokyo (JP)

( * ) Notice: Subject to any disclaimer, the term of this patent is extended or adjusted under 35 U.S.C. 154(b) by 105 days.

(21) Appl. No.: 16/313,113

(22) PCT Filed: Jun. 23, 2017

(86) PCT No.: PCT/JP2017/023157
§ 371 (c)(1),
(2) Date: Dec. 24, 2018

(87) PCT Pub. No.: WO2018/003682
PCT Pub. Date: Jan. 4, 2018

(65) Prior Publication Data
US 2019/0233679 A1 Aug. 1, 2019

(30) Foreign Application Priority Data
Jun. 28, 2016 (JP) .................. 2016-127826

(51) Int. Cl.
*C09J 4/00* (2006.01)
*C09J 11/06* (2006.01)

(52) U.S. Cl.
CPC .................. *C09J 4/00* (2013.01); *C09J 11/06* (2013.01)

(58) Field of Classification Search
CPC ..................................... C09J 4/00; C09J 11/06
See application file for complete search history.

(56) References Cited

U.S. PATENT DOCUMENTS

| 4,171,416 A * | 10/1979 | Motegi | C08G 65/00 |
| | | | 526/245 |
| 6,547,917 B1 * | 4/2003 | Misiak | C09J 4/00 |
| | | | 156/331.2 |
| 2011/0196092 A1 * | 8/2011 | Hally | C09J 4/00 |
| | | | 524/710 |

FOREIGN PATENT DOCUMENTS

| GB | 2 228 943 A | 9/1990 |
| JP | 53-129231 A | 11/1978 |
| JP | 60-179482 A | 9/1985 |
| JP | 63-128088 A | 5/1988 |
| JP | 2000-44891 A | 2/2000 |
| JP | 2002-533554 A | 10/2002 |
| JP | 2012-506470 A | 3/2012 |

OTHER PUBLICATIONS

International Search Report (PCT/ISA/210) issued in PCT/JP2017/023157, dated Jul. 18, 2017.
Written Opinion (PCT/ISA/237) issued in PCT/JP2017/023157, dated Jul. 18, 2017.

* cited by examiner

*Primary Examiner* — Robert D Harlan
(74) *Attorney, Agent, or Firm* — Birch, Stewart, Kolasch & Birch, LLP

(57) ABSTRACT

To provide a 2-cyanoacrylate-based adhesive composition not only exhibiting an excellent adhesion rate to a metal and a thermoplastic elastomer low in polarity, but also being excellent in storage stability. A 2-cyanoacrylate-based adhesive composition containing a 2-cyanoacrylic acid ester, and a compound having a sulfur atom-containing heteroallene structure.

10 Claims, No Drawings

2-CYANOACRYLATE-BASED ADHESIVE COMPOSITION

TECHNICAL FIELD

The present invention relates to a 2-cyanoacrylate-based adhesive composition mainly containing a 2-cyanoacrylic acid ester.

RELATED ART

Due to the specific anionic polymerizability of a 2-cyanoacrylic acid ester, which is a main component of a 2-cyanoacrylate-based adhesive composition, the 2-cyanoacrylate-based adhesive composition starts polymerization due to weak anions of slight moisture or the like attached to a surface of an adherend material and can strongly bond various materials in a short time period. Therefore, such an adhesive composition is used as a so-called instant adhesive in a wide range of fields including industrial, medical, and household applications. The 2-cyanoacrylate-based adhesive composition, however, is progressively cured by anionic polymerization. Therefore, in a case in which an adherend material is a wood material exhibiting acidity or a metal on which an oxide layer is easily formed, there is a problem that anionic polymerization may be inhibited, as a result of which adhesion rate decreases and it is not possible to achieve a sufficient adhesion strength. Moreover, in a case in which an adherend material is, for example, a thermoplastic elastomer low in polarity, there is a problem that anionic polymerization is suppressed and adhesion rate decreases.

Various additives have been conventionally proposed in order to solve the problems. For example, Patent Document 1 discloses an adhesive composition containing crown ethers, and Patent Document 2 discloses an adhesive composition containing polyalkylene oxides. Patent Documents 3 and 4 each disclose an adhesive composition containing calixarenes. Patent Document 5 describes use of a phase-transfer catalyst as a curing promoter of a 2-cyanoacrylate-based composition. Patent Document 6 discloses an adhesive composition containing a 2-substituted benzothiazole, and Patent Document 7 discloses an adhesive composition containing an organic compound having —N=C—S—S— as a constituent element.

PATENT DOCUMENTS

Patent Document 1: Japanese Patent Application Laid-Open (JP-A) No. S53-129231
Patent Document 2: JP-A No. S63-128088
Patent Document 3: JP-A No. S60-179482
Patent Document 4: JP-A No. 2000-44891
Patent Document 5: British Patent Application Publication No. 2228943
Patent Document 6: Japanese National-Phase Publication (JP-A) No. 2012-506470
Patent Document 7: JP-A No. 2002-533554

SUMMARY OF INVENTION

Technical Problem

However, the adhesive compositions disclosed in Patent Document 1 to 4 cannot, regardless of a requirement for further improvement in productivity, impart any satisfactory adhesion rate in a case in which an adherend material is a metal or a thermoplastic elastomer low in polarity, while the adhesive compositions enables adhesion rate to various adherend materials to be increased. Even in the case of using the phase-transfer catalyst specifically described in Patent Document 5 as a curing promoter, adhesion rate is insufficient in a case in which an adherend material is a metal or a thermoplastic elastomer low in polarity. In Patent Document 6 and 7 respectively, adhesion rate is insufficient in a case in which an adherend material is a metal or a thermoplastic elastomer low in polarity, and Patent Document 7 has the problem of having a need for use as a two-component type composition or a primer.

The invention has been made in view of the above conventional circumstances, and an object thereof is to provide an adhesive composition not only exhibiting an excellent adhesion rate to a metal and a thermoplastic elastomer low in polarity, but also being favorable in storage stability.

Solution to Problem

The inventors have found that an adhesive composition not only exhibiting an excellent adhesion rate to a metal and a thermoplastic elastomer low in polarity, but also being excellent in storage stability is obtained by compounding a compound having a sulfur atom-containing heteroallene structure with a 2-cyanoacrylic acid ester, thereby leading to the completion of the present invention.

The present invention is as follows.

<1> A 2-cyanoacrylate-based adhesive composition containing (a) a 2-cyanoacrylic acid ester, and (b) a compound having a sulfur atom-containing heteroallene structure, represented by the following Formula (1):

$$R_n\text{—}X\text{=}C\text{=}S \tag{1}$$

wherein X represents S, O, N or C, R represents a hydrogen atom or at least one selected from the group consisting of an alkyl group having from 1 to 10 carbon atoms, a cycloalkyl group, an alkenyl group, an alkynyl group, an aralkyl group and an aryl group, each of the groups may have a substituent, n denotes 0 in a case in which X represents an S atom or an O atom, n denotes 1 in a case in which X represents an N atom, n denotes 2 in a case in which X represents a C atom, and R's may be the same as or different from each other in a case in which two R's are present.

<2> The 2-cyanoacrylate-based adhesive composition according to <1>, wherein (b) the compound having a sulfur atom-containing heteroallene structure is at least one compound selected from the group consisting of carbon disulfide, carbonyl sulfide and a compound having an isothiocyanate group.

<3> The 2-cyanoacrylate-based adhesive composition according to <1>, wherein (b) the compound having a sulfur atom-containing heteroallene structure is a compound having an isothiocyanate group.

<4> The 2-cyanoacrylate-based adhesive composition according to any one of <1> to <3>, wherein a content of (b) the compound having a sulfur atom-containing heteroallene structure is from 0.0002 to 3 parts by mass with respect to 100 parts by mass of (a) the 2-cyanoacrylic acid ester.

<5> The 2-cyanoacrylate-based adhesive composition according to any one of <1> to <4>, further containing (c) an onium salt represented by the following Formula (2):

$$C^+A^- \tag{2}$$

wherein $C^+$ represents at least one onium cation selected from the group consisting of a quaternary ammonium cation, a quaternary phosphonium cation, an imidazolium cation, a pyridinium cation and a tertiary sulfonium cation, and A⁻ represents at least one anion selected from the group consisting of: a hydrogen sulfate anion; a hydrogen sulfite anion; a sulfonic acid anion represented by $R^1SO_3^-$ in which $R^1$ represents an alkyl group, a perfluoroalkyl group having from 1 to 10 carbon atoms, a cycloalkyl group, a vinyl group, an aryl group, a perfluoroaryl group, an aralkyl group or a halogen atom; and a bis(substituted sulfonyl)imide anion represented by $(R^2SO_2)_2N^-$ in which $R^2$ represents an alkyl group, a perfluoroalkyl group, an aryl group or a halogen atom.

<6> The 2-cyanoacrylate-based adhesive composition according to <5>, wherein the cation of (c) the onium salt is at least one onium cation selected from the group consisting of a quaternary ammonium cation, an imidazolium cation, a pyridinium cation and a tertiary sulfonium cation, and the anion thereof is at least one selected from the group consisting of a hydrogen sulfate anion, a perfluoroalkanesulfonic acid anion, a bis(fluorosulfonyl)imide anion and a bis(perfluoroalkanesulfonyl)imide anion.

<7> The 2-cyanoacrylate-based adhesive composition according to <5> or <6>, wherein a content of (c) the onium salt is from 0.001 to 2 parts by mass with respect to 100 parts by mass of (a) the 2-cyanoacrylic acid ester.

<8> The 2-cyanoacrylate-based adhesive composition according to any one of <1> to <7>, further containing (d) a compound having a clathrate ability.

<9> The 2-cyanoacrylate-based adhesive composition according to <8>, wherein (d) the compound having a clathrate ability is at least one compound selected from the group consisting of polyalkylene oxides, crown ethers and calixarenes.

<10> The 2-cyanoacrylate-based adhesive composition according to <8> or <9>, wherein a content of (d) the compound having a clathrate ability is from 0.001 to 3 parts by mass with respect to 100 parts by mass of (a) the 2-cyanoacrylic acid ester.

Advantageous Effects of Invention

The 2-cyanoacrylate-based adhesive composition of the present invention contains a 2-cyanoacrylic acid ester, and a compound having a sulfur atom-containing heteroallene structure, thereby not only exhibiting an excellent adhesion rate to a metal and a thermoplastic elastomer low in polarity, but also being favorable in storage stability.

In the case of further containing an onium salt having a specific structure in the 2-cyanoacrylate-based adhesive composition, the adhesion rate to a metal and a thermoplastic elastomer low in polarity further increases. The 2-cyanoacrylate-based adhesive composition exhibits a more excellent adhesion rate in a case in which an anion of the onium salt is at least one selected from the group consisting of a hydrogen sulfate anion, a perfluoroalkanesulfonic acid anion, a bis(fluorosulfonyl)imide anion and a bis(perfluoroalkanesulfonyl)imide anion.

DESCRIPTION OF EMBODIMENTS

Hereinafter, the 2-cyanoacrylate-based adhesive composition of the present invention (hereinafter, also simply referred to as "adhesive composition") will be described in detail.

The adhesive composition of the present invention contains (a) a 2-cyanoacrylic acid ester, and (b) a compound having a sulfur atom-containing heteroallene structure, represented by Formula (1):

$$R_n-X=C=S \qquad (1)$$

wherein X represents S, O, N or C, R represents a hydrogen atom or at least one selected from the group consisting of an alkyl group having from 1 to 10 carbon atoms, a cycloalkyl group, an alkenyl group, an alkynyl group, an aralkyl group and an aryl group, each of the groups may have a substituent, n denotes 0 in a case in which X represents an S atom or an O atom, n denotes 1 in a case in which X represents an N atom, n denotes 2 in a case in which X represents a C atom, and R's may be the same as or different from each other in a case in which two R's are present.

(a) The 2-cyanoacrylic acid ester that can be used is any 2-cyanoacrylic acid ester commonly used in such an adhesive composition without any particular limitation.

Examples of the 2-cyanoacrylic acid ester include methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl, and hexafluoroisopropyl esters of 2-cyanoacrylic acid. These 2-cyanoacrylic acid esters may be used singly, or in combination of two or more kinds thereof. Among these 2-cyanoacrylic acid esters, a 2-cyanoacrylic acid ester having an alkyl group having 3 or less carbon atoms is preferable and ethyl 2-cyanoacrylate is still more preferable because excellent curability is achieved.

The adhesive composition of the present invention contains (b) a compound having a sulfur atom-containing heteroallene structure. The compound is a compound that serves as a curing promoter of the adhesive composition and that improves the adhesion rate particularly to a metal or a non-polar and poorly adhesive material, such as a thermoplastic elastomer. Examples of the thermoplastic elastomer low in polarity include a styrene-based thermoplastic elastomer and an olefin-based thermoplastic elastomer.

(b) The compound having a sulfur atom-containing heteroallene structure, represented by Formula (1), means a sulfur-containing compound having, in one molecule, one or more heteroallene structures each having one or more sulfur atoms, and specific examples thereof include carbon disulfide, carbonyl sulfide, a thioketene compound or a compound having an isothiocyanate group. In the adhesive composition of the present invention, at least one compound selected from the group consisting of carbon disulfide, carbonyl sulfide and a compound having an isothiocyanate group is preferable because an effect of promoting curing is highly exerted, and a compound having an isothiocyanate group is still more preferable from the viewpoints of ease of handling and safety.

The compound having an isothiocyanate group is not particularly limited, and examples thereof include phenyl isothiocyanate, 2-chlorophenyl isothiocyanate, 2-methylphenyl isothiocyanate, 2-fluorophenyl isothiocyanate, 3,4-difluorophenyl isothiocyanate, 2,3,4-trifluorophenyl isothiocyanate, cyclohexyl isothiocyanate, benzyl isothiocyanate, butyl isothiocyanate, allyl isothiocyanate, 4-(trifluoromethyl)phenyl isothiocyanate, 3-fluorophenyl isothiocyanate, 3-fluoro-6-methylphenyl isothiocyanate, 4-hydroxyphenyl isothiocyanate, 2,6-diisopropylphenyl isothiocyanate, 1,4- phenylene diisothiocyanate, 3,5-bis(trifluoromethyl)phenyl isothiocyanate, acetyl isothiocyanate and 1,3-phenylene diisothiocyanate.

Among them, phenyl isothiocyanate, benzyl isothiocyanate and allyl isothiocyanate are preferable because these isothiocyanates highly exert the effect of promoting curing and are high in safety.

A content of (b) the compound having a sulfur atom-containing heteroallene structure in the adhesive composition of the present invention is preferably from 0.0002 to 3 parts by mass, more preferably from 0.00025 to 2.5 parts by mass, and still more preferably from 0.0003 to 2 parts by mass, with respect to 100 parts by mass of (a) the 2-cyanoacrylic acid ester. In a case in which the content is 0.0002 parts by mass or more, the effect as a curing promoter is efficiently obtained. In a case in which the content is 3 parts by mass or less, an excellent adhesion rate is achieved.

Not only (b) the "compound having a sulfur atom-containing heteroallene structure", but also (c) an onium salt represented by the following Formula (2) is preferably compounded in the adhesive composition of the present invention:

$$C^+A^- \quad (2)$$

wherein $C^+$ represents at least one onium cation selected from the group consisting of a quaternary ammonium cation, a quaternary phosphonium cation, an imidazolium cation, a pyridinium cation and a tertiary sulfonium cation, and $A^-$ represents at least one anion selected from the group consisting of: a hydrogen sulfate anion; a hydrogen sulfite anion; a sulfonic acid anion represented by $R^1SO_3^-$ in which $R^1$ represents an alkyl group, a perfluoroalkyl group having from 1 to 10 carbon atoms, a cycloalkyl group, a vinyl group, an aryl group, a perfluoroaryl group, an aralkyl group or a halogen atom; and a bis(substituted sulfonyl)imide anion represented by $(R^2SO_2)_2N^-$ in which $R^2$ represents an alkyl group, a perfluoroalkyl group, an aryl group or a halogen atom.

The detailed description of (c) the onium salt is made in International Publication No. 2014/042082.

Examples of the cation of the onium salt include an onium cation represented by the following Formula (3), an imidazolium cation, a pyridinium cation, and an onium cation represented by the following Formula (4).

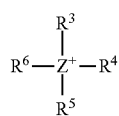

(3)

In Formula, $R^3$ to $R^6$ each independently represent an unsubstituted or substituted alkyl group, cycloalkyl group, aryl group, aralkyl group, alkenyl group or alkynyl group, each of the groups having from 1 to 20 carbon atoms; or a part or the entire of $R^3$ to $R^6$ is taken together with an atom represented by Z, to form an unsubstituted or substituted 3- to 10-membered ring (where the ring may include a hetero atom such as O or S), and $R^3$ to $R^6$ not involving in formation of the ring are as defined above; and Z represents a nitrogen atom or a phosphorus atom. Specific examples of the substituted alkyl group include an alkoxy group and an alkanoyl group. In a case in which a part of $R^3$ to $R^6$ forms a ring, two or three of $R^3$ to $R^6$ usually form a ring. Specific examples of the compound of Formula (3) where two of $R^3$ to $R^6$ form a ring include a piperidinium cation, morpholinium cation and a pyrrolidinium cation.

(4)

In Formula, $R^7$ to $R^9$ each independently represent an unsubstituted or substituted alkyl group, cycloalkyl group, aryl group, aralkyl group, alkenyl group or alkynyl group, each of the groups having from 1 to 20 carbon atoms; or a part or the entire of $R^7$ to $R^9$ is taken together with a sulfur atom to form an unsubstituted or substituted 3- to 10-membered ring (where the ring may include a hetero atom such as O or S), and $R^7$ to $R^9$ not involving in formation of the ring are as defined above. Specific examples of the substituted alkyl group include an alkoxy group and an alkanoyl group.

Representative examples of the onium cation represented by Formula (3) include a quaternary ammonium cation and a quaternary phosphonium cation.

Examples of the quaternary ammonium cation include those disclosed in International Publication No. 2014/042082 as mentioned above. Specific examples include: a tetraalkylammonium cation such as tetra-n-butylammonium, trimethylpentylammonium, hexyltrimethylammonium, heptyltrimethyl ammonium, trimethyloctyl ammonium, trimethylnonyl ammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium and hexyldimethyloctylammonium; an ammonium cation substituted with an aromatic alkyl group, such as benzyltrimethylammonium, benzyltributylammonium and benzyldodecyldimethylammonium; an aromatic substituted ammonium cation such as trimethylphenylammonium and tetraphenylammonium; and an aliphatic cyclic ammonium cation such as 1-ethyl-1-methylpyrrolidinium, 1,1-diethylpyrrolidinium, 1,1-tetramethylenepyrrolidinium, 1-butyl-1-methylpyrrolidinium, 1-ethyl-1-methylpiperidinium, 1,1-diethylpiperidinium and 1-butyl-1-methylpiperidinium), and among them, tetra-n-butylammonium is preferable because a high effect of increasing the adhesion rate is obtained.

Specific examples of the quaternary phosphonium cation can include cations such as tetramethylphosphonium, triethylmethylphosphonium and tetraethylphosphonium.

Examples of the imidazolium cation include those disclosed in International Publication No. 2014/042082 as mentioned above. Specific examples include 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-methylimidazolium, 2-ethyl-1,3-dimethylimidazolium, 1,3-dimethyl-2-n-propylimidazolium, 2-n-heptyl-1,3-dimethylimidazolium, 1,3,4-trimethylimidazolium and 2-ethyl-1,3,4-trimethylimidazolium.

Specific examples of the pyridinium cation include a cation such as 1-methylpyridinium, 1-ethylpyridinium, 1-n-propylpyridinium, 1-isopropylpyridinium, 1-n-butylpyridinium, 1-ethyl-3-methylpyridinium, 1-ethyl-4-methylpyridinium, 1-n-butyl-3-methylpyridinium and 1-n-butyl-4-methylpyridinium, and among them, 1-ethyl-3-methylpyridinium, 1-ethyl-4-methylpyridinium and 1-n-butyl-4-methylpyridinium are preferable because a high effect of increasing the adhesion rate is obtained.

Specific examples of the tertiary sulfonium cation represented by Formula (4) include a cation such as trimethylsulfonium, triethylsulfonium, tripropylsulfonium and triphenylsulfonium.

Among the cations, a quaternary ammonium cation, an imidazolium cation, a pyridinium cation or a tertiary sulfonium cation is preferable, and a quaternary ammonium cation, an imidazolium cation or a pyridinium cation is still more preferable, from the viewpoints of an excellent solubility of a corresponding onium salt in the 2-cyanoacrylic acid ester and a balance between curing promotion ability and storage stability of the adhesive composition.

Next, the anion of the onium salt is: a hydrogen sulfate anion; a hydrogen sulfite anion; a sulfonic acid anion represented by $R^1SO_3^-$ ($R^1$ represents an alkyl group, a perfluoroalkyl group having from 1 to 10 carbon atoms, a cycloalkyl group, a vinyl group, an aryl group, a perfluoroaryl group, an aralkyl group or a halogen atom); or a bis(substituted sulfonyl)imide anion represented by $(R^2SO_2)_2N^-$ ($R^2$ represents an alkyl group, a perfluoroalkyl group, an aryl group or a halogen atom). The number of carbon atoms in each alkyl group of $R^1$ and $R^2$ is preferably from 1 to 15.

Specific examples of the sulfonic acid anion represented by $R^1SO_3^-$ include an anion of methanesulfonic acid, ethanesulfonic acid, propanesulfonic acid, hexanesulfonic acid, heptanesulfonic acid, octanesulfonic acid, dodecanesulfonic acid, vinylsulfonic acid, benzenesulfonic acid, p-toluenesulfonic acid, dodecylbenzenesulfonic acid, 10-camphorsulfonic acid, pentafluorobenzenesulfonic acid, fluorinated sulfonic acid, chlorinated sulfonic acid, and brominated sulfonic acid. Examples of the perfluoroalkylsulfonic acid anion having from 1 to 10 carbon atoms include a perfluorooctanesulfonic acid anion. The number of carbon atoms in the perfluoroalkyl group is preferably from 1 to 8, from the viewpoint of the solubility of a corresponding onium salt in the 2-cyanoacrylic acid ester.

Specific examples of the bis(substituted sulfonyl)imide anion represented by $(R^2SO_2)_2N^-$ include a bis(methanesulfonyl)imide anion, a bis(ethanesulfonyl)imide anion, a bis(propanesulfonyl)imide anion, a bis(trifluoromethanesulfonyl)imide anion, a bis(pentafluoroethanesulfonyl)imide anion, a bis(heptafluoropropanesulfonyl)imide anion and a bis(nonafluorobutanesulfonyl)imide anion.

Among the anions, a hydrogen sulfate anion, a perfluoroalkanesulfonic acid anion, a bis(fluorosulfonyl)imide anion and a bis(perfluoroalkanesulfonyl)imide anion are preferable because an excellent adhesion rate to a metal and a thermoplastic elastomer is exhibited and storage stability of the adhesive composition is excellent.

The onium salt used in the present invention is not particularly limited, as long as the onium salt is a combination of the cation and the anion. Specific examples of the onium salt include tetraethylammonium hydrogen sulfate, tetra-n-butylammonium hydrogen sulfate, methyl tri-n-octylammonium hydrogen sulfate, amyl triethylammonium hydrogen sulfate, cyclohexyltrimethylammonium hydrogen sulfate, 1-ethyl-3-methylimidazolium hydrogen sulfate, 1-ethyl-2,3-dimethylimidazolium hydrogen sulfate, 1-butyl-3-methylimidazolium hydrogen sulfate, 1-butyl-2,3-dimethylimidazolium hydrogen sulfate, 1-methyl-3-n-octylimidazolium hydrogen sulfate, 1-hexyl-3-methylimidazolium hydrogen sulfate, 2-ethyl-1,3-dimethylimidazolium hydrogen sulfate, 1,3-dimethyl-2-n-propylimidazolium hydrogen sulfate, 1,3-dimethyl-2-n-pentylimidazolium hydrogen sulfate, 2-n-heptyl-1,3-dimethylimidazolium hydrogen sulfate, 1-ethyl-1-methylpiperidinium hydrogen sulfate, 1-butyl-1-methylpiperidinium hydrogen sulfate, 1-ethyl-1-methylpyrrolidinium hydrogen sulfate, 1-butyl-1-methylpyrrolidinium hydrogen sulfate, 1-methyl-1-propylpyrrolidinium hydrogen sulfate, 1-ethylpyridinium hydrogen sulfate, 1-ethyl-3-methylpyridinium hydrogen sulfate, 1-butyl-3-methylpyridinium hydrogen sulfate, 1-ethyl-4-methylpyridinium hydrogen sulfate, 1-butylpyridinium hydrogen sulfate, 1-butyl-4-methylpyridinium hydrogen sulfate, tetramethylphosphonium hydrogen sulfate, triethylmethylphosphonium hydrogen sulfate, tetraethylphosphonium hydrogen sulfate, tetra-n-butylammonium methanesulfonate, methyl tri-n-octylammonium methanesulfonate, 1-ethyl-3-methylimidazolium methanesulfonate, 1-ethyl-2,3-dimethylimidazolium methanesulfonate, 1-butyl-3-methylimidazolium methanesulfonate, 1-butyl-2,3-dimethylimidazolium methanesulfonate, 1-ethyl-1-methylpiperidinium methanesulfonate, 1-butyl-1-methylpiperidinium methanesulfonate, 1-ethyl-1-methylpyrrolidinium methanesulfonate, 1-butyl-1-methylpyrrolidinium methanesulfonate, 1-methyl-1-propylpyrrolidinium methanesulfonate, 1-ethylpyridinium methanesulfonate, 1-ethyl-3-methylpyridinium methanesulfonate, 1-butyl-3-methylpyridinium methanesulfonate, tetraethylphosphonium methanesulfonate, tetraethylphosphonium methanesulfonate, tetra-n-butylammonium p-toluenesulfonate, methyl tri-n-octyl ammonium p-toluenesulfonate, 1-ethyl-3-methylimidazolium p-toluenesulfonate, 1-ethyl-2,3-dimethylimidazolium p-toluenesulfonate, 1-butyl-3-methylimidazolium p-toluenesulfonate, 1-butyl-2,3-dimethylimidazolium p-toluenesulfonate, 1-ethyl-1-methylpiperidinium p-toluenesulfonate, 1-butyl-1-methylpiperidinium p-toluenesulfonate, 1-ethyl-1-methylpyrrolidinium p-toluenesulfonate, 1-butyl-1-methylpyrrolidinium p-toluenesulfonate, 1-methyl-1-propylpyrrolidinium p-toluenesulfonate, 1-ethylpyridinium p-toluenesulfonate, 1-ethyl-3-methylpyridinium p-toluenesulfonate, 1-butyl-3-methylpyridinium p-toluenesulfonate, tetraethylphosphonium p-toluenesulfonate, tetraethylammonium trifluoromethanesulfonate, tetra-n-butylammonium trifluoromethanesulfonate, methyl tri-n-butylammonium trifluoromethanesulfonate, methyl tri-n-octyl ammonium trifluoromethanesulfonate, amyltriethyl ammonium trifluoromethanesulfonate, cyclohexyltrimethylammonium trifluoromethanesulfonate, benzyltributylammonium trifluoromethanesulfonate, benzyldodecyldimethylammonium trifluoromethanesulfonate, didecyldimethyl ammonium trifluoromethanesulfonate, dilauryldimethylammonium trifluoromethanesulfonate, hexyldimethyloctylammonium trifluoromethanesulfonate, dodecyl(ferrocenylmethyl)dimethylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 1-methyl-3-n-octylimidazolium trifluoromethanesulfonate, 1-hexyl-3-methylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1,3-dimethyl-2-n- pentylimidazolium trifluoromethanesulfonate, 1,3-dimethyl-2-n-heptylimidazolium trifluoromethanesulfonate, 1-ethyl-1-methylpiperidinium trifluoromethanesulfonate, 1-butyl-1-methylpiperidinium trifluoromethanesulfonate, 1-ethyl-1-methylpyrrolidinium trifluoromethanesulfonate, 1-butyl-1-methylpyrrolidinium trifluoromethanesulfonate, 1-methyl-1-propylpyrrolidinium trifluoromethanesulfonate, 1-ethylpyridinium trifluoromethanesulfonate, 1-ethyl-3-methylpyridinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, 1-butyl-4-methylpyridinium trifluoromethanesulfonate, triethylsulfonium trifluoromethanesulfonate, tetraethylammonium bis(fluorosulfonyl)imide, tetra-n-butyl ammonium bis(fluorosulfonyl)imide, methyl tri-n-butylammonium bis(fluorosulfonyl)imide, methyl tri-n-octylammonium bis(fluorosulfonyl)imide, amyltriethyl ammonium bis(fluorosulfonyl)imide, cyclohexyltrimethylammonium bis(fluorosulfonyl)imide, benzyltributylammonium bis(fluorosulfonyl)imide, benzyldodecyldimethyl ammonium bis(fluorosulfonyl)imide, didecyldimethylammonium bis(fluorosulfonyl)imide, dilauryldimethylammonium bis(fluorosulfonyl)imide, hexyldimethyloctylammonium bis(fluorosulfonyl)imide, dodecyltrimethyl ammonium bis(fluorosulfonyl)imide, dodecyl(ferrocenylmethyl)dimethylammonium bis(fluorosulfonyl)imide, 1-ethyl-3-methylimidazolium bis(fluorosulfonyl)imide, 1-ethyl-2,3-dimethylimidazolium bis(fluorosulfonyl)imide, 1-butyl-3-methylimidazolium bis(fluorosulfonyl)imide, 1-butyl-2,3-dimethylimidazolium bis(fluorosulfonyl)imide, 1-methyl-3-n-octylimidazolium bis(fluorosulfonyl)imide, 1-hexyl-3-methylimidazolium bis(fluorosulfonyl)imide, 2-ethyl-1,3-dimethylimidazolium bis(fluorosulfonyl)imide, 1,3-dimethyl-2-n-propylimidazolium bis(fluorosulfonyl)imide, 1,3-dimethyl-2-n-pentylimidazolium bis(fluorosulfonyl)imide, 1,3-dimethyl-2-n-heptylimidazolium bis(fluorosulfonyl)imide, 1-ethyl-1-methylpiperidinium bis(fluorosulfonyl)imide, 1-butyl-1-methylpiperidinium bis(fluorosulfonyl)imide, 1-ethyl-1-methylpyrrolidinium bis(fluorosulfonyl)imide, 1-butyl-1-methylpyrrolidinium bis(fluorosulfonyl)imide, 1-methyl-1-propylpyrrolidinium bis(fluorosulfonyl)imide, 1-ethylpyridinium bis(fluorosulfonyl)imide, 1-ethyl-3-methylpyridinium bis(fluorosulfonyl)imide, 1-butyl-3-methylpyridinium bis(fluorosulfonyl)imide, 1-ethyl-4-methylpyridinium bis(fluorosulfonyl)imide, 1-butylpyridinium bis(fluorosulfonyl)imide, 1-butyl-4-methylpyridinium bis(fluorosulfonyl)imide, 4-methyl-1-octylpyridinium bis(fluorosulfonyl)imide, triethylsulfonium bis(fluorosulfonyl)imide, tetraethylphosphonium bis(fluorosulfonyl)imide, tetraethylammonium bis(trifluoromethanesulfonyl)imide, tetra-n-butylammonium bis(trifluoromethanesulfonyl)imide, methyl tri-n-octylammonium bis(trifluoromethanesulfonyl)imide, 1-ethyl-3-methylimidazolium bis(trifluoromethanesulfonyl)imide, 1-ethyl-2,3-dimethylimidazolium bis(trifluoromethanesulfonyl)imide, 1-butyl-3-methylimidazolium bis(trifluoromethanesulfonyl)imide, 1-butyl-2,3-dimethylimidazolium bis(trifluoromethanesulfonyl)imide, 1-ethyl-1-methylpiperidinium bis(trifluoromethanesulfonyl)imide, 1-butyl-1-methylpiperidinium bis(trifluoromethanesulfonyl)imide, 1-ethyl-1-methylpyrrolidinium bis(trifluoromethanesulfonyl)imide, 1-butyl-1-methylpyrrolidinium bis(trifluoromethanesulfonyl)imide, 1-methyl-1-propylpyrrolidinium bis(trifluoromethanesulfonyl)imide, 1-ethylpyridinium bis(trifluoromethanesulfonyl)imide, 1-ethyl-3-methylpyridinium bis(trifluoromethanesulfonyl)imide, 1-butyl-3-methylpyridinium bis(trifluoromethanesulfonyl)imide and triethylsulfonium bis(trifluoromethanesulfonyl)imide.

Among the above, tetra-n-butylammonium hydrogen sulfate, methyl tri-n-octylammonium hydrogen sulfate, amyl triethylammonium hydrogen sulfate, 1-ethyl-3-methylimidazolium hydrogen sulfate, 1-ethyl-2,3-dimethylimidazolium hydrogen sulfate, 1-butyl-3-methylimidazolium hydrogen sulfate, 1-butyl-2,3-dimethylimidazolium hydrogen sulfate, 1-ethyl-1-methylpiperidinium hydrogen sulfate, 1-ethyl-1-methylpyrrolidinium hydrogen sulfate, 1-butyl-3-methylpyridinium hydrogen sulfate, 1-butyl-4-methylpyridinium hydrogen sulfate, tetra-n-butylammonium trifluoromethanesulfonate, methyl tri-n-octylammonium trifluoromethanesulfonate, benzyltributylammonium trifluoromethanesulfonate, benzyldodecyldimethylammonium trifluoromethanesulfonate, didecyldimethylammonium trifluoromethanesulfonate, dilauryldimethylammonium trifluoromethanesulfonate, hexyldimethyloctylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1-ethyl-1-methylpiperidinium trifluoromethanesulfonate, 1-ethyl-1-methylpyrrolidinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, triethylsulfonium trifluoromethanesulfonate, tetra-n-butylammonium bis(fluorosulfonyl)imide, methyl tri-n-octylammonium bis(fluorosulfonyl)imide, benzyltributylammonium bis(fluorosulfonyl)imide, benzyldodecyldimethylammonium bis(fluorosulfonyl)imide, didecyldimethylammonium bis(fluorosulfonyl)imide, dilauryldimethylammonium bis(fluorosulfonyl)imide, hexyldimethyloctylammonium bis(fluorosulfonyl)imide, dodecyltrimethylammonium bis(fluorosulfonyl)imide, 1-ethyl-3-methylimidazolium bis(fluorosulfonyl)imide, 1-ethyl-2,3-dimethylimidazolium bis(fluorosulfonyl)imide, 1-butyl-3-methylimidazolium bis(fluorosulfonyl)imide, 1-butyl-2,3-dimethylimidazolium bis(fluorosulfonyl)imide, 1-ethyl-1-methylpiperidinium bis(fluorosulfonyl)imide, 1-ethyl-1-methylpyrrolidinium bis(fluorosulfonyl)imide, 1-butyl-3-methylpyridinium bis(fluorosulfonyl)imide, 1-ethyl-4-methylpyridinium bis(fluorosulfonyl)imide, 1-butylpyridinium bis(fluorosulfonyl)imide, 1-butyl-4-methylpyridinium bis(fluorosulfonyl)imide and triethylsulfonium bis(fluorosulfonyl)imide are preferable because a high effect of increasing the adhesion rate is obtained.

The onium salt of the present invention can be produced by a known method. For example, the onium salt can be produced from a corresponding onium halide as described in J. Am. Chem. Soc., 2005, 27, 2398-2399 by Hiroyuki Ohno et al., or Green Chemistry, 2002, 4, 134-138 by Peter Wasserscheid et al.

A content of (c) the onium salt in the adhesive composition of the present invention is preferably from 0.001 to 2 parts by mass, more preferably from 0.002 to 1.5 parts by mass, and still more preferably from 0.003 to 1 part by mass, with respect to 100 parts by mass of (a) the 2-cyanoacrylic acid ester. In a case in which the content is 0.001 parts by mass or more, the effect as a curing promoter is efficiently obtained. In a case in which the content is 2 parts by mass or less, the storage stability of the adhesive composition is excellent.

While the reason why (b) the compound having a sulfur atom-containing heteroallene structure does not have any adverse effect on the storage stability of the adhesive composition and exhibits an excellent adhesion rate to a metal and a poorly adhesive material low in polarity, such as a thermoplastic elastomer, is not clear, it is presumed as follows. That is, this sulfur compound has electrophilicity, and therefore suppresses anionic polymerization during storage and rather improves the stability of the adhesive composition. It is simultaneously considered that the structure of the sulfur compound is favorable in affinity with rubbers because the structure is similar to the structure of a vulcanizing agent of rubbers or a vulcanization promoter, or both thereof, and is also favorable in affinity with a metal because the structure includes a hetero atom having an unpaired electron, whereby the structure releases an anion that can serve as a polymerization initiator by interaction with a salt slightly further attached to a surface of an adherend material.

The adhesive composition of the present invention can be further improved in the adhesion rate to a metal and a thermoplastic elastomer without having any adverse effect on the storage stability of the adhesive composition, in a case in which (c) the onium salt is used in combination with (b) the compound having a sulfur atom-containing heteroallene structure.

The reason for such an improvement is not clear, but it is considered that the amount of anions that can serve as a polymerization initiator, to be released, is increased by interaction of both such components with a slight amount of salt attached to a surface of an adherend material.

The adhesive composition of the present invention is preferably further compounded with (d) a conventional compound having a clathrate ability, as a curing promoter other than (b) the compound having a sulfur atom-containing heteroallene structure and (c) the onium salt. (d) The compound having a clathrate ability, in the present invention, serves to not only usually promote curing, but also suppress an increase in an acid content of the adhesive composition over time, and also has the effect of improving the storage stability of the adhesive composition for maintaining initial performance.

Examples of (d) the compound having a clathrate ability include polyalkylene oxides, crown ethers, silacrown ethers, calixarenes, cyclodextrins and pyrogallol-based cyclic compounds.

The polyalkylene oxides refer to polyalkylene oxides and derivatives thereof, and examples thereof include those disclosed in, for example, Japanese Patent Publication (JP-B) No. S60-37836, JP-B No. H01-43790, JP-A No. S63-128088, JP-A No. H03-167279, and U.S. Pat. Nos. 4,386,193 and 4,424,327. Specific examples include (1) a polyalkylene oxide such as diethylene glycol, triethylene glycol, polyethylene glycol and polypropylene glycol, and (2) a derivative of polyalkylene oxide, such as a polyethylene glycol monoalkyl ester, a polyethylene glycol dialkyl ester, a polypropylene glycol dialkyl ester, a diethylene glycol monoalkyl ether, a diethylene glycol dialkyl ether, a dipropylene glycol monoalkyl ether and a dipropylene glycol dialkyl ether.

Examples of the crown ethers include those disclosed in JP-B No. S55-2238 and JP-A No. H03-167279. Specific examples include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6 and 1,2-vinylbenzo-15-crown-5.

Examples of the silacrown ethers include those disclosed in JP-A No. S60-168775. Specific examples include dimethyl sila-11-crown-4, dimethyl sila-14-crown-5 and dimethyl sila-17-crown-6.

Examples of the calixarenes include those disclosed in JP-A No. S60-179482, JP-A No. S62-235379, and JP-A No. S63-88152. Specific examples include 5,11,17,23,29,35-hexa-tert-butyl-37,38,39,40,41,42-hexahydroxycalix[6]arene, 37,38,39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene and 4-tert-butylcalix[4]arene-O,O',O",O"'-tetraacetic acid tetraethyl ester.

Examples of the cyclodextrins include those disclosed in JP-A No. H05-505835. Specific examples include $\alpha$-, $\beta$- or $\gamma$-cyclodextrin.

Examples of the pyrogallol-based cyclic compounds include compounds disclosed in JP-A No. 2000-191600. Specific examples include 3,4,5,10,11,12,17,18,19,24,25,26-dodecaethoxycarbomethoxy-C-1, C-8, C-15 and C-22-tetramethyl[14]-metacyclophane.

(d) The compound having a clathrate ability may be used singly, or in combination of two or more kinds thereof. Among the above, at least one compound selected from the group consisting of the polyalkylene oxides, the crown ethers and the calixarenes is preferable because the adhesive composition exhibits an excellent adhesion rate to a metal and a thermoplastic elastomer and the effect of improving the storage stability of the adhesive composition is highly exerted.

A content of (d) the compound having a clathrate ability in the adhesive composition of the present invention is preferably from 10 to 30,000 ppm, more preferably from 50 to 20,000 ppm, and still more preferably from 100 to 10,000 ppm, with respect to 100 parts by mass of (a) the 2-cyanoacrylic acid ester. In a case in which the content is in a range of from 10 to 30,000 ppm, the adhesion rate to various adherend materials can be improved with the storage stability of the adhesive composition being not impaired.

The adhesive composition of the present invention can be compounded with not only the various curing promoters, but also a stabilizer, a plasticizer, a thickener, particles, a colorant, a flavor, a solvent or a reinforcing agent conventionally compounded and used in an adhesive composition containing a 2-cyanoacrylic acid ester, in appropriate amounts depending on the intended use, as long as the curability, the adhesion strength and the like of the adhesive composition are not impaired.

Examples of the stabilizer include (1) anionic polymerization inhibitors, for example, sulfur dioxide, an aliphatic sulfonic acid such as methanesulfonic acid, an aromatic sulfonic acid such as p-toluenesulfonic acid, a boron trifluoride complex such as boron trifluoride methanol and boron trifluoride diethyl ether, $HBF_4$, and trialkyl borate, and (2) radical polymerization inhibitors such as hydroquinone, hydroquinone monomethyl ether, t-butylcatechol, catechol and pyrogallol. These stabilizers may be used singly, or in combination of two or more kinds thereof.

Examples of the plasticizer include triethyl acetylcitrate, tributyl acetylcitrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexyl cyclohexyl carboxylate, diisobutyl fumarate, diisobutyl maleate, caproic acid triglyceride, 2-ethylhexyl benzoate and dipropylene glycol dibenzoate. Among these plasticizers, tributyl acetylcitrate, dimethyl adipate, dimethyl phthalate, 2-ethylhexyl benzoate and dipropylene glycol dibenzoate are preferable because the plasticizers are favorable in compatibility with the 2-cyanoacrylic acid ester and high in plasticizing efficiency. These plasticizers may be used singly, or in combination of two or more kinds thereof.

Examples of the thickener include polymethyl methacrylate, a copolymer of methyl methacrylate and acrylate, a copolymer of methyl methacrylate and other methacrylate, acrylic rubber, polyvinyl chloride, polystyrene, cellulose ester, polyalkyl-2-cyanoacrylic acid ester and an ethylene-vinyl acetate copolymer. These thickeners may be used singly, or in combination of two or more kinds thereof.

EXAMPLES

Hereinafter, the present invention will be more specifically described with reference to Examples, but the present invention is not intended to be limited to such Examples without departing from the gist of the present invention. In the following, "part(s)" and "%" are on a mass basis, unless particularly noted.

The adhesive composition of the present invention was evaluated as follows.
(1) Adhesion Rate The adhesion rate was measured under an environment of 23° C. and 60% RH (relative humidity) according to the "method of testing α-cyanoacrylate-based adhesive" in JIS K 6861. The test pieces used are as follows.
Aluminum: aluminum test piece (material: A1050P) manufactured by Nippon Testpanel Co., Ltd.
Iron: iron test piece (material: S10C) manufactured by Nippon Testpanel Co., Ltd.
Styrene-based thermoplastic elastomer: trade name "ACTYMER A E-2060S" manufactured by RIKEN TECHNOS CORP.
(2) Viscosity The viscosity was measured with an E-type viscometer under conditions of 25° C. and 100 rpm (revolutions per minute).
(3) Storage Stability The storage stability was evaluated by storing each test piece under an environment of 60° C. for 2 weeks, and comparing the adhesion rate and the viscosity at the initial stage and after the storage. The storage was performed by sealing 1.5 g of the adhesive composition in a 2 g polyethylene container.

Example 1

Ethyl 2-cyanoacrylate was compounded with 20 ppm of sulfur dioxide and 1,000 ppm of hydroquinone (provided that the amount of ethyl 2-cyanoacrylate was 100 parts by mass), 10 ppm of phenyl isothiocyanate (reagent) was compounded therewith, and the resultant was stirred and mixed at room temperature (from 15° C. to 30° C.) for 30 minutes, whereby an adhesive composition was produced. The resulting adhesive composition was used to evaluate the adhesion rate to aluminum, iron and a thermoplastic elastomer, the viscosity, and the storage stability. The results are as set forth in Table 1.

Examples 2 to 12

Each adhesive composition was produced and evaluated in the same manner as in Example 1, except that the kind and the amount of (b) the compound having a sulfur atom-containing heteroallene structure, to be added to each adhesive composition, were changed as set forth in Table 1. The results are as set forth in Table 1.

Comparative Examples 1 to 3

Each adhesive composition was produced and evaluated in the same manner as in Example 1, except that only (d) the compound having a clathrate ability was compounded instead of (b) the compound having a sulfur atom-containing heteroallene structure, or such curing promoters were not compound. The results are as set forth in Table 1.

TABLE 1

| | | Formulation | | | Initial | | | | After 2 weeks at 60° C. | | | |
| | | | | | Adhesion rate (sec) | | | | Adhesion rate (sec) | | | |
| | | Kind | Content (ppm) | Aluminum | Iron | Thermoplastic elastomer | Viscosity (mPa·s) | Aluminum | Iron | Thermoplastic elastomer | Viscosity (mPa·s) |
|---|---|---|---|---|---|---|---|---|---|---|---|
| Example | 1 (b) | Phenyl isothiocyanate | 10 | 5 | 15 | 20 | 2.0 | 5 | 15 | 20 | 2.2 |
| | 2 Compound | Phenyl isothiocyanate | 100 | 7 | 15 | 20 | 2.1 | 7 | 15 | 20 | 2.3 |
| | 3 having | Phenyl isothiocyanate | 500 | 7 | 15 | 30 | 2.2 | 7 | 15 | 30 | 2.5 |
| | 4 sulfur atom- | Phenyl isothiocyanate | 2500 | 7 | 20 | 60 | 2.2 | 7 | 20 | 60 | 2.5 |
| | 5 containing | Benzyl isothiocyanate | 10 | 10 | 15 | 20 | 2.0 | 10 | 15 | 20 | 2.2 |
| | 6 heteroallene | Benzyl isothiocyanate | 100 | 10 | 20 | 20 | 2.0 | 10 | 20 | 20 | 2.2 |
| | 7 structure | Allyl isothiocyanate | 500 | 7 | 15 | 20 | 2.0 | 10 | 20 | 20 | 2.2 |
| | 8 | Octyl isothiocyanate | 20 | 7 | 15 | 20 | 2.2 | 7 | 15 | 20 | 2.4 |
| | 9 | 2,4-Difluorophenyl isothiocyanate | 20 | 7 | 10 | 30 | 2.1 | 7 | 15 | 30 | 2.2 |
| | 10 | Carbon disulfide | 3 | 15 | 15 | 30 | 2.0 | 15 | 15 | 30 | 2.2 |
| | 11 | Carbon disulfide | 6 | 10 | 15 | 20 | 2.0 | 10 | 20 | 20 | 2.2 |
| | 12 | Carbon disulfide | 120 | 15 | 15 | 30 | 2.0 | 15 | 15 | 30 | 2.2 |
| Comparative Example | 1 Others | 18-Mcrown-6 | 500 | 10 | 10 | 90 | 2.4 | 10 | 10 | 120 | 4.4 |
| | 2 | 4-tert-Butylcalix[4]arene-O,O',O'',O'''-tetraacetic acid tetraethyl ester | 2000 | 10 | 10 | 120 | 2.2 | 15 | 15 | 180 | 2.4 |
| | 3 | Not added | — | 15 | 30 | 300 | 2.3 | 15 | 20 | >300 | 2.2 |

Example 13

Ethyl 2-cyanoacrylate was compounded with 20 ppm of sulfur dioxide and 1,000 ppm of hydroquinone (provided that the amount of ethyl 2-cyanoacrylate was 100 parts by mass), 10 ppm of phenyl isothiocyanate (reagent) and 500 ppm of 1-ethyl-3-methylimidazolium trifluoromethanesulfonate (reagent) were compounded therewith, and the resultant was stirred and mixed at room temperature (from 15° C. to 30° C.) for 30 minutes, whereby an adhesive composition was produced. The resulting adhesive composition was used to evaluate the adhesion rate to aluminum, iron and a thermoplastic elastomer, the viscosity, and the storage stability. The results are as set forth in Tables 2-1 and 2-2.

Examples 14 to 20

Each adhesive composition was produced and evaluated in the same manner as in Example 13, except that (b) the compound having a sulfur atom-containing heteroallene structure, and other curing promoter ((c) the onium salt or (d) the compound having a clathrate ability), to be added to each adhesive composition, were changed as set forth in Tables 2-1 and 2-2. The results are as set forth in Tables 2-1 and 2-2.

TABLE 2-1

| | | Formulation (1) | | Formulation (2) | | Initial | | | | After 2 weeks at 60° C. | | | |
| | | (b) Compound having sulfur atom-containing heteroallene structure | Content (ppm) | (c) Onium salt compound, or (d) compound having clathrate ability | Content (ppm) | Adhesion rate (sec) | | | Viscosity (mPa · s) | Adhesion rate (sec) | | | Viscosity (mPa · s) |
| | | | | | | Aluminum | Iron | Thermoplastic elastomer | | Aluminum | Iron | Thermoplastic elastomer | |
|---|---|---|---|---|---|---|---|---|---|---|---|---|---|
| Example | 13 | Phenyl isothiocyanate | 10 | 1-Ethyl-3-methyl imidazolium trifluoromethane sulfonate | 500 | 5 | 7 | 10 | 2.2 | 10 | 15 | 15 | 2.7 |
| | 14 | Phenyl isothiocyanate | 10 | 1-Ethyl-3-methyl imidazolium trifluoromethane sulfonate | 1000 | 5 | 7 | 15 | 2.4 | 15 | 30 | 30 | 3.0 |
| | 15 | Phenyl isothiocyanate | 100 | 1-Ethyl-3-methyl imidazolium trifluoromethane sulfonate | 2500 | 5 | 7 | 15 | 2.5 | 15 | 30 | 30 | 3.2 |
| | 16 | Phenyl isothiocyanate | 10 | 1-Ethyl-3-methyl imidazolium bis(fluoromethane sulfonyl)imide | 250 | 5 | 10 | 15 | 2.1 | 10 | 15 | 20 | 2.5 |

TABLE 2-2

| | | Formulation (1) | | Formulation (2) | | Initial | | | | After 2 weeks at 60° C. | | | |
| | | (b) Compound having sulfur atom-containing heteroallene structure | Content (ppm) | (c) Onium salt compound, or (d) compound having clathrate ability | Content (ppm) | Adhesion rate (sec) | | | Viscosity (mPa · s) | Adhesion rate (sec) | | | Viscosity (mPa · s) |
| | | | | | | Aluminum | Iron | Thermoplastic elastomer | | Aluminum | Iron | Thermoplastic elastomer | |
|---|---|---|---|---|---|---|---|---|---|---|---|---|---|
| Example | 17 | Phenyl isothiocyanate | 10 | Tetrabutylammonium trifluoromethane sulfonate | 500 | 5 | 7 | 15 | 2.2 | 10 | 15 | 20 | 2.6 |
| | 18 | Phenyl isothiocyanate | 10 | 4-Methyl-1-octylpyridinium bis(trifluoromethane sulfonyl)imide | 500 | 7 | 7 | 15 | 2.4 | 15 | 30 | 30 | 4.2 |
| | 19 | Benzyl isothiocyanate | 10 | 18-Crown-6 | 500 | 5 | 7 | 10 | 2.4 | 15 | 15 | 30 | 3.5 |
| | 20 | Benzyl isothiocyanate | 50 | 4-tert-Butylcalix[4]arene-O,O',O'',O'''-tetraacetic acid tetraethyl ester | 2500 | 5 | 10 | 10 | 2.1 | 10 | 15 | 30 | 2.6 |

Example 21

Ethyl 2-cyanoacrylate was compounded with 20 ppm of sulfur dioxide and 1,000 ppm of hydroquinone (provided that the amount of ethyl 2-cyanoacrylate was 100 parts by mass), 10 ppm of phenyl isothiocyanate (reagent), 500 ppm of 1-ethyl-3-methylimidazolium trifluoromethanesulfonate (reagent) and 2,500 ppm of 15-crown-5 were compounded therewith, and the resultant was stirred and mixed at room temperature (from 15° C. to 30° C.) for 30 minutes, whereby an adhesive composition was produced. The resulting adhesive composition was used to evaluate the adhesion rate to aluminum, iron and a thermoplastic elastomer, the viscosity, and the storage stability. The results are as set forth in Tables 3-1 to 3-3.

Examples 22 to 27

Each adhesive composition was produced and evaluated in the same manner as in Example 21, except that (b) the compound having a sulfur atom-containing heteroallene structure, (c) the onium salt, and (d) the compound having a clathrate ability, to be added to each adhesive composition, were changed as set forth in Tables 3-1 to 3-3. The results are as set forth in Tables 3-1 to 3-3.

TABLE 3-1

| | | Formulation (1) | | Formulation (2) | | Initial | | | | After 2 weeks at 60° C. | | | |
| | | (b) Compound having sulfur atom-containing heteroallene structure | Content (ppm) | (c) Onium salt compound, or (d) compound having clathrate ability | Content (ppm) | Adhesion rate (sec) | | | Viscosity (mPa·s) | Adhesion rate (sec) | | | Viscosity (mPa·s) |
| | | | | | | Aluminum | Iron | Thermoplastic elastomer | | Aluminum | Iron | Thermoplastic elastomer | |
|---|---|---|---|---|---|---|---|---|---|---|---|---|---|
| Example | 21 | Phenyl isothiocyanate | 10 | 1-Ethyl-3-methyl imidazolium trifluoromethane sulfonate | 500 | 5 | 7 | 10 | 2.0 | 5 | 7 | 15 | 2.2 |
| | | | | 15-crown-5 | 2500 | | | | | | | | |
| | 22 | Phenyl isothiocyanate | 20 | 1-Ethyl-3-methyl imidazolium trifluoromethane sulfonate | 500 | 5 | 7 | 10 | 2.2 | 5 | 10 | 15 | 2.5 |
| | | | | 18-Crown-6 | 250 | | | | | | | | |
| | 23 | Phenyl isothiocyanate | 40 | 1-Ethyl-3-methyl imidazolium trifluoromethane sulfonate | 500 | 5 | 7 | 10 | 2.0 | 5 | 7 | 15 | 2.2 |
| | | | | 4-tert-Butylcalix[4]arene-O,O',O'',O'''-tetraacetic acid tetraethyl ester | 2500 | | | | | | | | |

TABLE 3-2

| | | Formulation (1) | | Formulation (2) | | Initial | | | | After 2 weeks at 60° C. | | | |
| | | (b) Compound having sulfur atom-containing heteroallene structure | Content (ppm) | (c) Onium salt compound, or (d) compound having clathrate ability | Content (ppm) | Adhesion rate (sec) | | | Viscosity (mPa·s) | Adhesion rate (sec) | | | Viscosity (mPa·s) |
| | | | | | | Aluminum | Iron | Thermoplastic elastomer | | Aluminum | Iron | Thermoplastic elastomer | |
|---|---|---|---|---|---|---|---|---|---|---|---|---|---|
| Example | 24 | Phenyl isothiocyanate | 10 | 1-Ethyl-3-methyl imidazolium trifluoromethane sulfonate | 500 | 5 | 7 | 10 | 2.3 | 5 | 7 | 10 | 2.5 |
| | | | | Methoxy polyethylene glycol methacrylate | 500 | | | | | | | | |
| | 25 | Phenyl isothiocyanate | 1000 | 1-Ethyl-3-methyl imidazolium trifluoromethane sulfonate | 500 | 5 | 7 | 20 | 2.3 | 5 | 7 | 20 | 2.3 |
| | | | | Methoxy polyethylene glycol methacrylate | 500 | | | | | | | | |

TABLE 3-2-continued

| | | Formulation (1) (b) Compound having sulfur atom-containing heteroallene structure | Content (ppm) | Formulation (2) (c) Onium salt compound, or (d) compound having clathrate ability | Content (ppm) | Initial Adhesion rate (sec) | | | | After 2 weeks at 60° C. Adhesion rate (sec) | | | |
|---|---|---|---|---|---|---|---|---|---|---|---|---|---|
| | | | | | | Aluminum | Iron | Thermoplastic elastomer | Viscosity (mPa · s) | Aluminum | Iron | Thermoplastic elastomer | Viscosity (mPa · s) |
| | 26 | Octyl isothiocyanate | 20 | 1-Ethyl-3-methyl imidazolium bis(trifluoromethane sulfonyl)imide Methoxy polyethylene glycol methacrylate | 500 <br> 5000 | 5 | 10 | 10 | 2.2 | 5 | 10 | 15 | 2.4 |

TABLE 3-3

| | | Formulation (1) (b) Compound having sulfur atom-containing heteroallene structure | Content (ppm) | Formulation (2) (c) Onium salt compound, or (d) compound having clathrate ability | Content (ppm) | Initial Adhesion rate (sec) | | | | After 2 weeks at 60° C. Adhesion rate (sec) | | | |
|---|---|---|---|---|---|---|---|---|---|---|---|---|---|
| | | | | | | Aluminum | Iron | Thermoplastic elastomer | Viscosity (mPa · s) | Aluminum | Iron | Thermoplastic elastomer | Viscosity (mPa · s) |
| Example | 27 | Allyl isothiocyanate | 40 | Triethylsulfonium bis(trifluoromethane sulfonyl)imide 15-Crown-5 | 10000 <br> 2500 | 7 | 10 | 20 | 4.2 | 7 | 15 | 30 | 4.3 |

According to the results in Table 1, it is found that the adhesive compositions of Examples 1 to 12 exhibited a more excellent adhesion rate particularly to the thermoplastic elastomer, compared to the adhesive compositions (Comparative Examples 1 and 2) in which a conventional curing promoter was compounded and the adhesive composition (Comparative Example 3) in which no curing promoter was added, and were less changed in the viscosity after 2 weeks at 60° C. and were also more excellent in storage stability compared to the adhesive composition of each of such Comparative Examples.

According to the results in Tables 2-1 and 2-2, it is found that the adhesive compositions of Examples 13 to 20 exhibited a more excellent adhesion rate to iron and the thermoplastic elastomer, compared to any adhesive composition in which only (b) the compound having a sulfur atom-containing heteroallene structure was compounded or any adhesive composition in which a conventional curing promoter was compounded (Example 13, 14 or 16 with Example 1, Example 15 with Example 2, Example 19 with Example 5, Example 19 with Comparative Example 1, and Example 20 with Comparative Example 2).

According to the results in Tables 3-1 to 3-3, it is found that the adhesive compositions of Examples 21 to 27 exhibited wholly an excellent adhesion rate to each of various materials, and, in particular, were high in the adhesion rate, less changed in the viscosity, and more excellent in the storage stability after 2 weeks at 60° C., compared to any adhesive composition in which only (b) the compound having a sulfur atom-containing heteroallene structure was compounded or any adhesive composition in which (c) the onium salt compound or (d) the compound having a clathrate ability was compounded (Example 21 with Example 1 or Example 13).

INDUSTRIAL APPLICABILITY

The adhesive composition of the present invention contains a 2-cyanoacrylic acid ester, and can be used as a so-called instant adhesive in a wide range of products and technical fields including not only general household and medical fields, but also various industries. The adhesive composition is useful particularly for adhesion of automobile parts, electric and electronic components, and various footwear products. According to the results in Tables 1, 2-1, 2-2, and 3-1 to 3-3, the adhesive composition exhibits an excellent adhesion rate particularly to a thermoplastic elastomer, and is also excellent in storage stability.

What is claimed is:
1. A 2-cyanoacrylate-based adhesive composition comprising:
(a) a 2-cyanoacrylic acid ester; and
(b) a compound having a sulfur atom-containing heteroallene structure, represented by the following Formula (1):

$$R_n-X=C=S \tag{1}$$

wherein X represents S O, N or C, R represents a hydrogen atom or at least one selected from the group consisting of an alkyl group having from 1 to 10 carbon atoms, a cycloalkyl group, an alkenyl group, an alkynyl group, an aralkyl group and an aryl group, each of the groups may have a substituent, n denotes 0 in a case in which X represents an S atom or an O atom, n denotes 1 in a case in which X represents an N atom, n denotes 2 in a case in which X represents a C atom, and R's may be the same as or different from each other in a case in which two R's are present.

2. The 2-cyanoacrylate-based adhesive composition according to claim 1, wherein (b) the compound having a sulfur atom-containing heteroallene structure is at least one compound selected from the group consisting of carbon disulfide, carbonyl sulfide and a compound having an isothiocyanate group.

3. The 2-cyanoacrylate-based adhesive composition according to claim 1, wherein (b) the compound having a sulfur atom-containing heteroallene structure is a compound having an isothiocyanate group.

4. The 2-cyanoacrylate-based adhesive composition according to claim 1, wherein a content of (b) the compound having a sulfur atom-containing heteroallene structure is from 0.0002 to 3 parts by mass with respect to 100 parts by mass of (a) the 2-cyanoacrylic acid ester.

5. The 2-cyanoacrylate-based adhesive composition according to claim 1, further comprising (c) an onium salt represented by the following Formula (2):

$$C^+A^- \qquad (2)$$

wherein $C^+$ represents at least one onium cation selected from the group consisting of a quaternary ammonium cation, a quaternary phosphonium cation, an imidazolium cation, a pyridinium cation and a tertiary sulfonium cation, and $A^-$ represents at least one anion selected from the group consisting of: a hydrogen sulfate anion; a hydrogen sulfite anion; a sulfonic acid anion represented by $R^1SO_3^-$ in which $R^1$ represents an alkyl group, a perfluoroalkyl group having from 1 to 10 carbon atoms, a cycloalkyl group, a vinyl group, an aryl group, a perfluoroaryl group, an aralkyl group or a halogen atom; and a bis(substituted sulfonyl)imide anion represented by $(R^2SO_2)_2N^-$ in which $R^2$ represents an alkyl group, a perfluoroalkyl group, an aryl group or a halogen atom.

6. The 2-cyanoacrylate-based adhesive composition according to claim 5, wherein the cation of (c) the onium salt is at least one onium cation selected from the group consisting of a quaternary ammonium cation, an imidazolium cation, a pyridinium cation and a tertiary sulfonium cation, and the anion thereof is at least one selected from the group consisting of a hydrogen sulfate anion, a perfluoroalkanesulfonic acid anion, a bis(fluorosulfonyl)imide anion and a bis(perfluoroalkanesulfonyl)imide anion.

7. The 2-cyanoacrylate-based adhesive composition according to claim 5, wherein a content of (c) the onium salt is from 0.001 to 2 parts by mass with respect to 100 parts by mass of (a) the 2-cyanoacrylic acid ester.

8. The 2-cyanoacrylate-based adhesive composition according to claim 1, further comprising (d) a compound having a clathrate ability.

9. The 2-cyanoacrylate-based adhesive composition according to claim 8, wherein (d) the compound having a clathrate ability is at least one compound selected from the group consisting of polyalkylene oxides, crown ethers and calixarenes.

10. The 2-cyanoacrylate-based adhesive composition according to claim 8, wherein a content of (d) the compound having a clathrate ability is from 0.001 to 3 parts by mass with respect to 100 parts by mass of (a) the 2-cyanoacrylic acid ester.

* * * * *